Patented Mar. 22, 1927.

1,621,825

UNITED STATES PATENT OFFICE.

KINNISON S. BOYNTON, OF OAKLAND, CALIFORNIA, ASSIGNOR, BY DIRECT AND MESNE ASSIGNMENTS, TO E-Z-WAY CO., OF OAKLAND, CALIFORNIA, A CORPORATION OF CALIFORNIA.

INSECTICIDE AND FUNGICIDE.

No Drawing.    Application filed July 25, 1923.   Serial No. 653,608.

My invention has for its object an insecticide and fungicide preferably in dry or in paste form which may be mixed with water and spread on trees or shrubs or painted about the bases of trees to band them, and to kill the insect and fungus life and as a protection against the migration of insects.

My insecticide has the advantage of cheapness and efficiency and may be advantageously transported because of its highly concentrated nature. When employed in sprays it may be diluted with substantially 800 parts of water. It is a very stable mixture because of the stability of the polysulfides and the excess of sulphur. This results in longer life and increased effectiveness of the spray as the oxidation is slower when on the leaf, hence it kills later hatches as well as the mature insects at the time of spraying.

A further object is the production of a commercial insecticide suitable for mixing with the hardest irrigation water. The soap powder ingredient mentioned below is employed to give maximum spreading and holding qualities to the spray and at the same time to act as a water softener. There is no agitation necessary to keep the spray mixed when used for orchard purposes as the only precipitate formed is that from the impurities in the water used.

The mixture of my invention consists primarily of sodium sulfide or polysulfides that are water soluble in about 30% of their weight of water when hot. I prefer to employ the sodium sulfide which as obtained in commercial form will average about 35 to 40 percent water. This then has a melting point of substantially 120° centigrade, which I melt and add thereto sulphur preferably in powder form and in sufficient proportions to saturate the metallic radicle present and placing into equilibrium the sulfur-sulfide system in the bath. The sulfur and sulfide react, forming a series of polysulfides of the metal used, as for example $Na_2S_2$, $Na_2S_3$, $Na_2S_4$, etc., until saturation in sulfur is reached for this particular system.

This reaction heats up the bath so that if the sulfur is added slowly with agitation there is enough heat liberated to keep the bath active until all of the sulfur is added. The temperature of the mixture should be kept below 225° C., the ignition point of sulfur.

Should sulfur be added in excess it immediately forms a molten scum on top of the bath and may be skimmed off and used in the next batch. A small quantity of water may now be added to cool the bath and to solidify the sulfur and give the right consistency to the finished paste.

Although I have directed particular attention to the polysulfides there will of course be formed other substances in the mixture, as the thio-sulfate of soda due to oxygen action during the reaction, these however do not detract from the desired qualities of the final product.

The mixture which I have found particularly effective is prepared as follows: to 100 pounds of commercial sodium sulfide (62%) melted in an iron container I add 30 to 40 pounds sulfur in small quantities while stirring. During the addition of the sulfur the fire is turned off under the vat, the liquidity being maintained by the chemical combination which takes place due to the formation of the polysulphides. The mass is now allowed to cool maintaining an agitation during the cooling process and water is added to keep the finished product in a pasty consistency.

To the above mixture I add about 60 pounds of soap powder or soap product, thoroughly mixing to a smooth paste and to this I also prefer to add about 2% of powdered copper sulfate. This copper sulfate may be added as a solution in the water above mentioned and if desired tobacco essence or nicotine may also be added.

To use the above as an insecticide, as for example in spraying of trees I mix about 8 pounds with 100 gallons of water.

The finished paste is hygroscopic and should be kept in sealed drums or containers until used.

If it is desired to employ the insecticide as a powder, the addition of water to the sulfur and sodium sulfide mixture as above described is omitted, and the product may then be readily powdered. The powder should be mixed with soap so that the proportion of polysulfides to soap is about 1 to 4; and to this 2% by weight of dry copper sulfate powder or other powders, as powdered tobacco or nicotine sulfate essence may be added. The mass should then be further powdered and screened to uniform size of grain, which is readily soluble in water. When so prepared it may be employed either as a powder or in solution as desired.

In employing tobacco extract or nicotine sulfate, I prefer to use a water solution of the nicotine as part of the water of saponification and by so doing I get a thorough emulsion. The amount of nicotine sulfate in the finished product should then be substantially 4%.

I claim:

1. An insecticide formed of sodium sulphide which is melted and to which is added sulphur to form polysulphides of sodium, the mixture is allowed to partly cool and soap is added to form a paste when cold.

2. An insecticide formed of sodium sulphide which is melted and to which is added sulphur to form polysulphides of sodium, the mixture is allowed to partly cool and soap is aded to form a paste when cold and substantially 2% of copper sulphate.

3. An insecticide composed of substantially 100 pounds of sodium sulphide, 35 pounds sulphur mixed hot, then cooled and water added to a paste consistency, to which is now added substantially 60 pounds of soap powder.

4. An insecticide composed of substantially 100 pounds of sodium sulphide, 35 pounds sulphur mixed hot, then cooled and water added to a paste consistency, to which is now aded substantially 60 pounds of soap powder, and substantially 2% sulphate of copper.

5. The method of producing a paste like insecticide of soap and poly-sulphides of sodium which consists of adding sulphur to melted sodium sulphide and adding soap powder to form a paste.

6. The method of producing a paste like insecticide which consists of adding sulphur to sulphide of sodium melted in its own water of crystallization to substantial saturation then partly cooling the mixture and then adding soap until the mixture has a paste consistency.

7. An insecticide material formed of sodium sulphide which has been melted and to which sulphur has been added to form polysulphides of sodium and to which soap has been thereafter added.

8. An insecticide material formed of sodium sulphide which has been melted and to which sulphur has been added to form polysulphides of sodium and to which soap has been thereafter added and 2% of copper sulphate.

9. An insecticide composed of substantially 100 pounds of sodium sulphide, 35 pounds of sulphur mixed hot, then cooled and mixed with substantially 60 pounds of soap.

10. An insecticide composed of substantially 100 pounds of sodium sulphide, 35 pounds of sulphur mixed hot, then cooled and mixed with substantially 60 pounds of soap and substantially 2% of sulphate of copper.

KINNISON S. BOYNTON.